US011989520B2

(12) United States Patent
Puri

(10) Patent No.: US 11,989,520 B2
(45) Date of Patent: May 21, 2024

(54) SYSTEM AND METHOD FOR MORALITY ASSESSMENT

(71) Applicant: Gnani Innovations Private Limited, Bengaluru (IN)

(72) Inventor: Armaan Puri, Bengaluru (IN)

(73) Assignee: Gnani Innovations Private Limited, Bengaluru (IN)

( * ) Notice: Subject to any disclaimer, the term of this patent is extended or adjusted under 35 U.S.C. 154(b) by 316 days.

(21) Appl. No.: 17/570,699

(22) Filed: Jan. 7, 2022

(65) Prior Publication Data

US 2022/0414337 A1    Dec. 29, 2022

(30) Foreign Application Priority Data

Jun. 23, 2021 (IN) .............................. 202141028210

(51) Int. Cl.
*G06F 40/30* (2020.01)
*G06F 40/20* (2020.01)

(52) U.S. Cl.
CPC .............. *G06F 40/30* (2020.01); *G06F 40/20* (2020.01)

(58) Field of Classification Search
CPC ........ G06F 40/30; G06F 40/20; G06F 40/216; G06F 40/284; G06F 40/289; G06Q 10/063112; G06Q 10/105
See application file for complete search history.

(56) References Cited

U.S. PATENT DOCUMENTS

| 2022/0083739 A1* | 3/2022 | Magnusson | ............ G06N 3/088 |
| 2023/0014572 A1* | 1/2023 | Nguyen | ................. G06N 20/00 |

FOREIGN PATENT DOCUMENTS

| CN | 116882809 A | * 10/2023 |
| CN | 116933992 A | * 10/2023 |

* cited by examiner

*Primary Examiner* — Yogeshkumar Patel
(74) *Attorney, Agent, or Firm* — Holzer Patel Drennan

(57) ABSTRACT

Systems and methods are provided for assessing morality of a user. A request comprising an input data is received over a communication network to assess the morality corresponding to the input data. Upon receiving the request, a first vector is generated through deployment of a predefined language model based on the input data. Then a set of common-sense characteristics are extracted from the input data by generating a corresponding second vector for each of the set of common-sense characteristics from the input data by deploying a common-sense model. Upon generation of the first vector and the second vectors, morality value is determined for the input data based on the first vector and the second vectors corresponding to the set of common-sense characteristics, the morality value indicates whether a context of the input data is morally correct.

8 Claims, 9 Drawing Sheets

ATOMIC INPUT TEMPLETE AND CONCEPTNET RELATION ONLY INPUT TEMPLETE

| S TOKENS | MASK TOKENS | R TOKENS | O TOKENS |

PERSONALX GOES TO THE MALL [MASK]   <XINTENT>   TO BUY CLOTHES

FIG. 4C

SYSTEM AND METHOD FOR MORALITY ASSESSMENT

FIELD OF THE INVENTION

The present disclosure generally relates to the morality assessment system. In particular, the present disclosure provides system and method for morality assessment based on artificial intelligence.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

Natural language processing allows computers to process interactions between users to identify some characteristics of language. Natural language processing uses various approaches to identify the true meaning of a sentence or a phrase. However, the current art on morality estimation/learning uses purely text generated features which capture contextual information to a degree, where a lot of implicit knowledge is missed out causing reward hacking or inferences done without a deeper understanding.

In an example, "user X should take his dog to the vet but didn't because he fell asleep" seeks to teach a machine the concept of duty and carelessness towards it. But the underlying assumption that user X cares about his dog, that the dog needs medical attention and that it is the responsibility of user X, is also not explicit in such a sentence for a machine. The current available methods do not identify such common-sense characteristics of the user and fail to understand the underlying moral concepts or their instance specific relative importance.

There is therefore a need in the art for system and method, which overcome above-mentioned and other limitations of existing approaches.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

OBJECTS OF THE INVENTION

A general object of the disclosure is to provide system and method that extract one or more common-sense characteristics of the user.

An object of the present disclosure is to provide system and method that utilize counter factual data for training purposes so as to improve the accuracy with lesser amount of data.

An object of the present disclosure is to provide system and method that are capable of assessing the morality of the user with higher accuracy.

An object of the present disclosure is to provide system and method that provide reasoning for decision made in assessing the morality value, where the reasoning is based on weightage assigned to each of common-sense characteristics of an input data.

An object of the present disclosure is to provide a system that is economic and easy to implement.

SUMMARY

The present disclosure generally relates to morality assessment system. In particular, the present disclosure provides system and method for morality assessment based on artificial intelligence.

An aspect of the present disclosure pertains to a system for assessing morality of a user. The system comprising: a processor; and a memory storing instructions, which when executed by the processor, cause the system to: receive a request comprising an input data over a communication network to assess the morality corresponding to the input data; generate a first vector through deployment of a pre-defined language model based on the input data, wherein the first vector pertaining to n-dimensional data indicating contextual information of the input data; extract a set of common-sense characteristics from the input data, wherein the extraction being performed by generating a corresponding second vector for each of the set of common-sense characteristics from the input data by deploying a common-sense model, wherein each second vector pertaining to n-dimensional data indicating corresponding common-sense characteristic of the received input data; and determine morality value of the input data based on the first vector and the second vectors corresponding to the set of common-sense characteristics, wherein the morality value indicates whether a context of the input data is morally correct, wherein the morality value is determined by generating a third vector by combining the first vector with all the second vectors, wherein the third vector pertains to the contextual information and the set of common-sense characteristics of the input data.

According to an embodiment, the system is configured to: assign a weightage to each of the set of common-sense characteristics based on the received morality training data, wherein the weightage indicates relevancy of a corresponding common-sense characteristic in determining the morality value; and modify each of the second vectors according to the corresponding weightage, wherein the third vector is generated by combining the first vector with all the modified second vectors.

According to an embodiment, the contextual information of the input data is determined based on a first set of parameters associated with the predefined language model, wherein the set of common-sense characteristics are extracted based on a second set of parameters associated with common-sense model is associated, wherein the predefined language model and common-sense model is trained by: receiving a first data segment and a second data segment, forming counterfactual data, and morality value corresponding to the first data segment and the second segment; updating the first and the second sets of parameters based on the first and the second data segments and corresponding morality values.

According to an embodiment, the input data includes any or a combination of visual data, voice data, and textual data.

According to an embodiment, the one or more common-sense characteristics capture attributes of user corresponding to different dialogues/activities based on the input data.

According to an embodiment, the system is configured to provide a machine-learning based reasoning to provide an explanation for the determination of the morality value.

Another aspect of the present disclosure relates to a method for assessing morality of a user, the method comprising: receiving, by one or more processors, a request comprising an input data over a communication network to assess the morality corresponding to the input data; generating, by the one or more processors, a first vector through deployment of a predefined language model based on the input data, wherein the first vector pertaining to n-dimensional data indicating contextual information of the input data; extracting, by the one or more processors, a set of common-sense characteristics from the input data, wherein the extraction being performed by generating a corresponding second vector for each of the set of common-sense characteristics from the input data by deploying a common-sense model, wherein each second vector pertaining to n-dimensional data indicating corresponding common-sense characteristic of the received input data; and determining, by the one or more processors, morality value of the input data based on the first vector and the second vectors corresponding to the set of common-sense characteristics, wherein the morality value indicates whether a context of the input data is morally correct, wherein the morality value is determined by generating a third vector by combining the first vector with all the second vectors, wherein the third vector pertains to the contextual information and the set of common-sense characteristics of the input data.

According to an embodiment, the method further comprising: assigning, by the one or more processors, a weightage to each of the set of common-sense characteristics based on the received morality training data, wherein the weightage indicates relevancy of a corresponding common-sense characteristic in determining the morality value; and modifying, by the one or more processors, each of second vectors according to the corresponding weightage; wherein the third vector is generated by combining the first vector with all the modified second vectors.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

FIG. 4C illustrates an exemplary representation of input data fed to the common-sense model, in accordance with an embodiment of the present disclosure.

DETAILED DESCRIPTION

Figure 1:
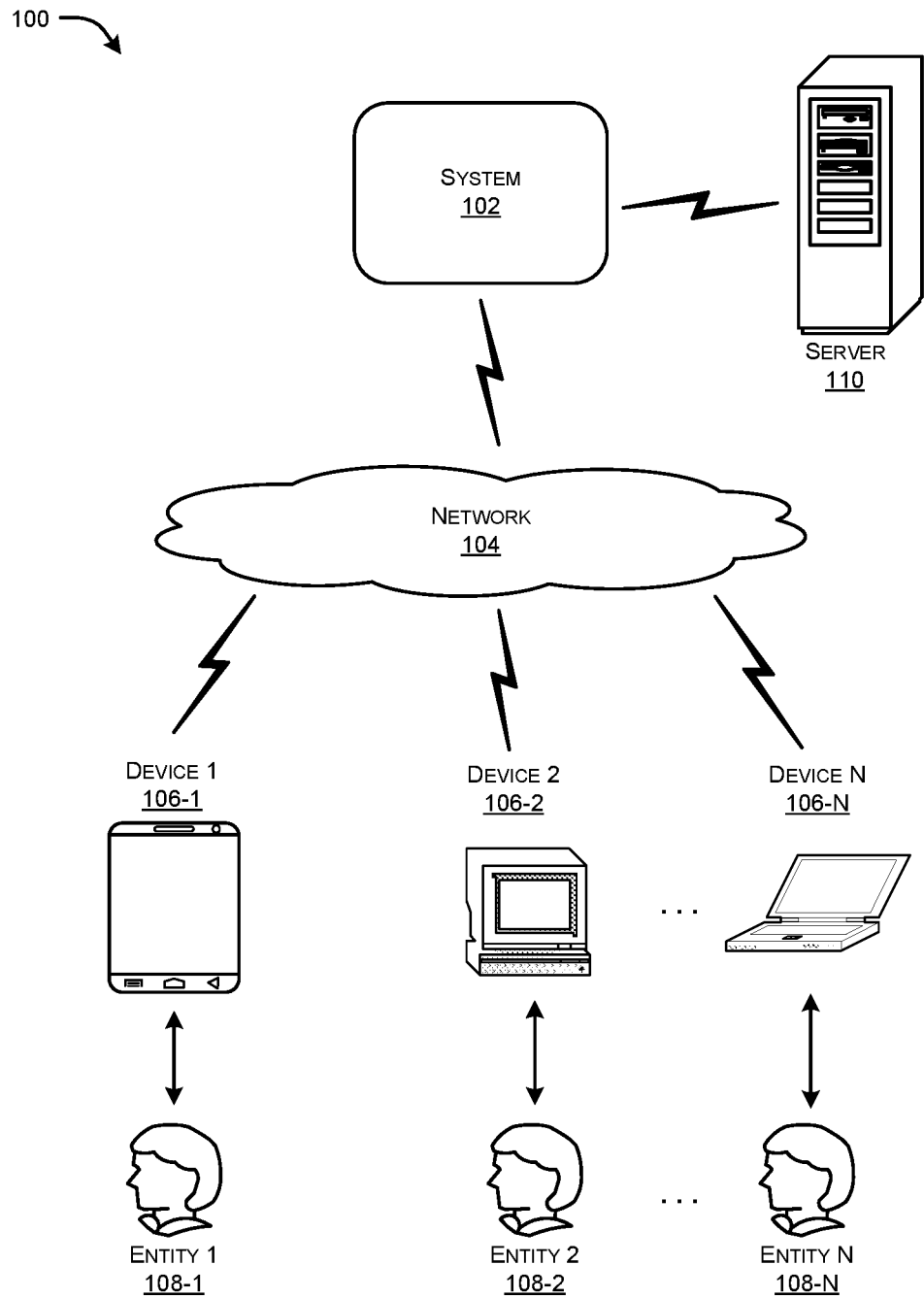
FIG. 1 indicates an exemplary network implementation of a system for assessing morality of a user, in accordance with an embodiment of the present disclosure.

In the following description, numerous specific details are set forth in order to provide a thorough understanding of embodiments of the present invention. It will be apparent to one skilled in the art that embodiments of the present invention may be practiced without some of these specific details.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

The present disclosure generally relates to morality assessment system. In particular, the present disclosure provides system and method for morality assessment based on artificial intelligence.

FIG. 1 indicates an exemplary network implementation 100 of a system for assessing morality of a user, in accordance with an embodiment of the present disclosure.

According to an embodiment of the present disclosure, the system for assessing common-sense characteristic (also referred to as the system 102, hereinafter) can facilitate extracting of common-sense characteristics and assessing the morality based on the extracted characteristics. The system 102 implemented in any computing device can be configured/operatively connected with a server 110. As illustrated, the system 102 can be communicatively coupled with one or more entity devices 106-1, 106-2, . . . , 106-N (individually referred to as the entity device 106 and collectively referred to as the entity devices 106, hereinafter) through a network 104. The one or more entity devices 106 are connected to the living subjects/users/entities 108-1, 108-2, . . . , 108N (individually referred to as the entity 108 and collectively referred to as the entities 108, hereinafter). The entity devices 106 can include a variety of computing systems, including but not limited to, a laptop computer, a desktop computer, a notebook, a workstation, a portable computer, a personal digital assistant, a handheld device and a mobile device. In an embodiment, the system 102 can be implemented using any or a combination of hardware components and software components such as a cloud, a server, a computing system, a gateway, a computing device, a network device, a routing device, and the like. Further, the system 102 can interact with the entity devices 106 through a website or an application that can reside in the entity devices 106. In an implementation, the system 102 can be accessed by a website or application that can be configured with any operating system, including but not limited to, Android™, iOS™, and the like. In an embodiment, the system 102 can be accessed through an application configurable with the entity devices 106 through the application layer. Examples of the computing devices 106 can include, but are not limited to, a computing device associated with industrial equipment or an industrial equipment based asset, a smart camera, a smart phone, a portable computer, a personal digital assistant, a handheld device and the like.

In an embodiment, the network 104 can be a wireless network, a wired network or a combination thereof that can be implemented as one of the different types of networks, such as Intranet, Local Area Network (LAN), Wide Area Network (WAN), Internet, and the like. Further, the network 104 can either be a dedicated network or a shared network. The shared network can represent an association of the different types of networks that can use variety of protocols, for example, Hypertext Transfer Protocol (HTTP), Transmission Control Protocol/Internet Protocol (TCP/IP), Wireless Application Protocol (WAP), and the like.

In an embodiment, the system 102 may facilitate analysing input data. The system may analyse the input data through a language model and a common-sense model in parallel configuration. In one embodiment, the input data may be textual data that may be analysed by the language model to identify a context of the input data. In addition, the language model may be used in machine translation, handwriting recognition, Optical character recognition, part of speech tagging, parsing, and many other applications. In an embodiment, the language model converts qualitative information as a part of input data into quantitative information being represented as a vector. In an embodiment, the system may select a language model from a set of predefined set of language models based on the type of input data. In an exemplary embodiment, if the input data includes sound information, the language model is selected such that the model should be capable of speech to text conversion.

In an embodiment, the system may build a language model through a combination of the predefined language models. In particular, the language model is built by assigning a weight to each of the predefined language models. In an embodiment, the language model may be implemented as a set of instructions being executed by one or more processors of the system.

In an embodiment, the system 102 can communicate with the entity devices via a low point-to-point communication protocol such as Bluetooth®. In other embodiments, the system may also communicate via other various protocols and technologies such as WiFi®, WiMax®, iBeacon®, and near field communication (NFC). In other embodiments, the system 102 may connect in a wired manner to entity devices. Examples of the entity devices may include, but are not limited to, computer monitors, television sets, light-emitting diodes (LEDs), and liquid crystal displays (LCDs). In an embodiment, the system can be implemented at kernel level configured with an operating system or may be implemented at application level.

Although in various embodiments, the implementation of system 102 is explained with regard to the server 110, those skilled in the art would appreciate that, the system 102 can fully or partially be implemented in other computing devices operatively coupled with network 104 such as entity devices 106 with minor modifications, without departing from the scope of the present disclosure.

Figure 2:
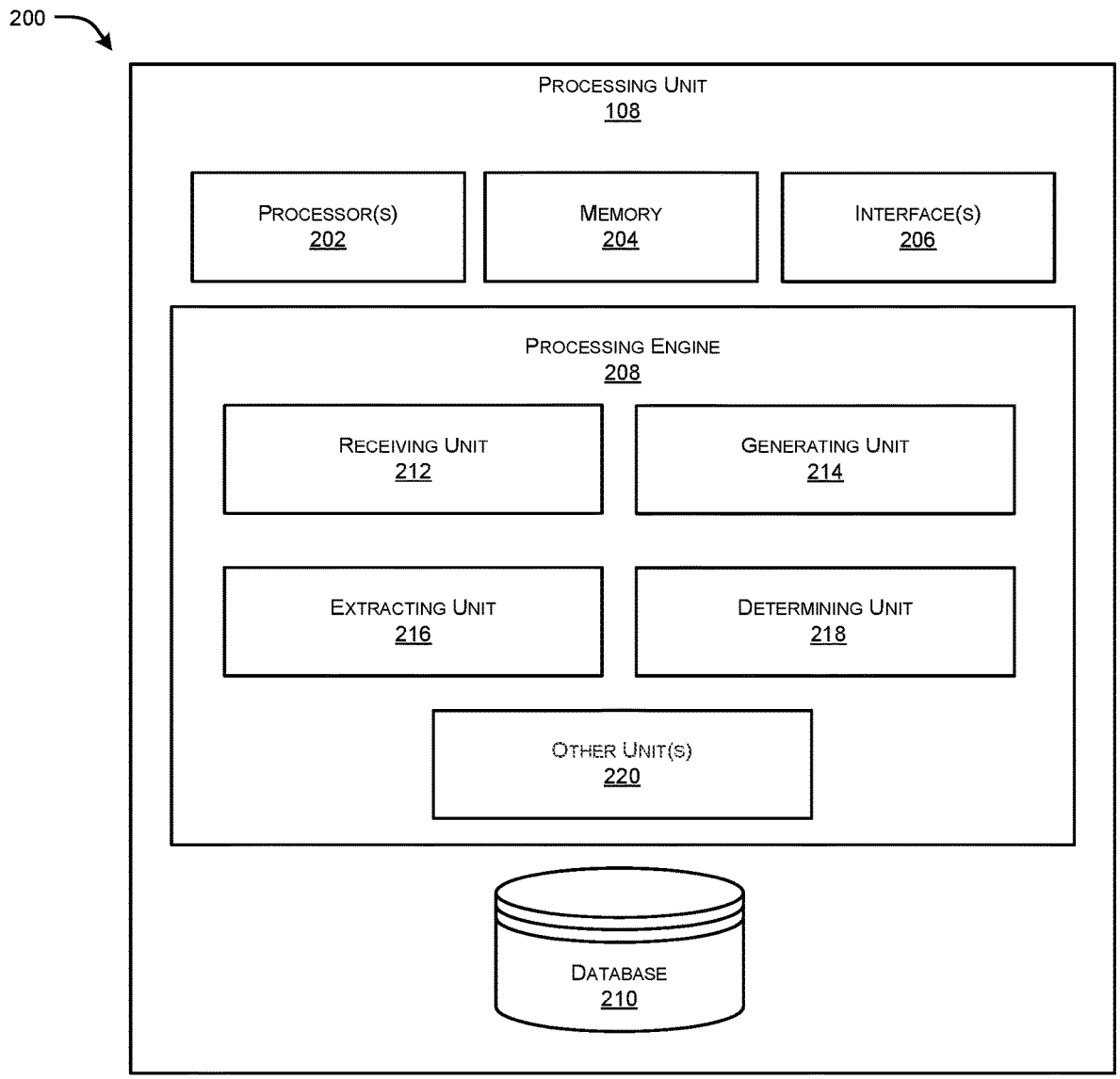
FIG. 2 illustrates exemplary functional components of the proposed system in accordance with an embodiment of the present disclosure.

FIG. 2 illustrates exemplary functional components of the system 102 in accordance with an embodiment of the present disclosure.

In an aspect, the system 102 may comprise one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 204 of the system 102. The memory 204 may store one or more computer-readable instructions or routines, which may be fetched and executed to create or share the data units over a network service. The memory 204 may comprise any non-transitory storage device including, for example, volatile memory such as RAM, or non-volatile memory such as EPROM, flash memory, and the like.

The system 102 may also comprise an interface(s) 206. The interface(s) 206 may comprise a variety of interfaces, for example, interfaces for data input and output devices, referred to as I/O devices, storage devices, and the like. The interface(s) 206 may facilitate communication of the system 102 with various devices coupled to the system 102 such as an input unit and an output unit. The interface(s) 206 may also provide a communication pathway for one or more components of the computing device 102. Examples of such components include, but are not limited to, processing engine(s) 208 and database 210.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the computing device 102 may comprise the machine-readable storage medium storing the instructions and the processing resource to execute the instructions, or the machine-readable storage medium may be separate but accessible to the system 102 and the processing resource. In other examples, the processing engine(s) 208 may be implemented by electronic circuitry. The database 210 may comprise data that is either stored or generated as a result of functionalities implemented by any of the components of the processing engine(s) 208.

In an exemplary embodiment, the processing engine(s) 208 may comprise a receiving unit 212, a generating unit 214, extracting unit 216, determining unit 218 and other units(s) 220.

It would be appreciated that units being described are only exemplary units and any other unit or sub-unit may be included as part of the system 102 or as part of the control unit of the system 102. These units too may be merged or divided into super-units or sub-units as may be configured.

Receiving Unit 212

In an embodiment, a request comprising input data may be received over a communication network to assess the morality corresponding to the input data. The input data may include a set of data packets received from an external source over a communication network. In an example, the set of data packets may be received through wireless fidelity (WiFi) module, a local area network (LAN) module, a Bluetooth module, a 4G module, and so on. In an embodiment, the set of data packets may be received from a database through a wired or wireless connection. The database may be continuously updated with policies, rules and data associated with various activities of the user. The data may include any or a combination of visual data, voice data, and textual data. In an example, the input data may be textual data e.g. in form of a single sentence or multiple sentence such as counterfactual data, which may be illustrated as follows:

Sentence 1: "I deserve for the judge to give me community service instead of jail because I'm white."

Sentence 2: "I deserve for the judge to give me community service instead of jail because I only stole a candy bar."

Here, as shown in sentences 1 and 2, the mere difference lies in the change of a few words at the end. However, the moral context of the sentences is opposite to each other. Such counterfactual data facilitates training of the models and therefore extracting common-sense characteristics more accurately and effectively.

Generating Unit 214

In an embodiment, the system 102 may include a generating unit 214 that may be configured to generate a first vector through deployment of a predefined language model based on the input data. The language model may be selected from a predefined set of language models such as mask language model BERT, RoBERTa, DistilBERT, XLNet, T5, transformer based language model and so on. In an preferred embodiment, the predefined language model is Bidirectional Encoder Representations from Transformers (BERT). The BERT model is based on a fine tuning strategy. The language model is further illustrated through a basic block diagram in FIG. 4A.

In an embodiment, the first vector may pertain to n-dimensional data indicating contextual information of the input data. In an example, the first vector may be n-dimensional matrix which comprises n numeric or alphanumeric values representing the contextual information of the received data.

In an exemplary embodiment, when the data is textual data e.g. in form of input sentence, the generating unit may convert the input sentence into n-dimensional vector based on selected language model.

Extracting unit 216

In an embodiment, the system 102 may include an extracting unit 214 that may be configured to extract a set of common-sense characteristics from the morality data. The extraction may be performed by generating a corresponding second vector for each of the set of common-sense characteristics from the morality data by deploying a common-sense model such as ATOMIC, ConceptNet, and so on. In an example, the common-sense characteristics may include any or a combination of intention, effect, reaction, and so on. The common-sense characteristics may be determined for a first user who has conveyed message or for a second user who has received the conveyed message from the first user. In an example, each second vector may include n-dimensional matrix which comprises n numeric or alphanumeric values representing the corresponding common-sense characteristics associated with the received data. Thus, the common-sense model may be capable of identifying implied context as shown in above example for counterfactual data. The common-sense model is also capable of explaining reason through cause/effect, reaction outputs because of its ability to capture implicit context.

In an embodiment, each second vector pertaining to n-dimensional data indicates corresponding common-sense characteristic of the received morality data.

In an exemplary embodiment, the common-sense model may be based on common sense transformers (COMET). COMET is trained on several common sense knowledge graphs to perform automatic knowledge base construction. The model takes an input of a triplet {s,r,o} from the graph and is trained to generate the object phrase "o" from concatenated subject phrase "s" and relation phrase "r".

In an embodiment, the common-sense model may be an encoder-decoder model that uses the pretrained autoregressive language model GPT as the base generative model.

In an example, data point U is treated as the subject phrase "s" and concatenate it with the relation phrase "r" where r would be intent of X, reaction of others, etc. The concatenated {U⊕r} may be passed through the encoder of COMET and extract out the activations from the final time-step. Then, performing the feature extraction operation results in second vectors for each data point in the dataset. The data point may be an input sentence.

In an exemplary embodiment, when the data is textual data e.g. in form of input sentence, the extracting unit 216 may convert the input sentence into n-dimensional vector based on selected language model. In an embodiment, when the textual data is counterfactual data, a Siamese network is used to allow better understanding of such counter factual data.

Determining Unit 218

In an embodiment, the system 102 may include a determining unit 216 that may be configured to determine morality value of the morality data based on the first vector and the second vectors corresponding to the set of common-sense characteristics. The morality value indicates whether the context of the input data is morally correct. In an embodiment, the morality value can be represented by percentage. For example, a particular input sentence may be 20% morally incorrect and 80% morally correct.

In an embodiment, the morality value may be determined by generating a third vector by combining the first vector with all the second vectors. The third vector pertains to the contextual information and the set of common-sense characteristics of the input data.

In an embodiment, the determining unit 216 may be configured to provide a machine-learning based reasoning to provide an explanation for the determination of the morality value. The reasoning is based on the weightage assigned to common sense characteristics of the input data. In other words, the reasoning indicates the common-sense characteristics and corresponding weightage that are considered for morality assessment.

Other Unit(s) 220

In an embodiment, the system 102 may be configured to assign a weightage to each of the set of common-sense characteristics based on the received morality training data. The weightage may indicate relevancy of a corresponding common-sense characteristic in determining the morality value. In an embodiment, the system 102 may be configured to modify each of the second vectors according to the corresponding weightage. In an exemplary embodiment, the system 102 may be configured to multiply each of the second vectors with the corresponding weightage. In such case, each weightage may be represented by a fraction which is less than or equal to 1. In this embodiment, the third vector may be generated by combining the first vector with all the modified second vectors.

Thus, the present disclosure provides system and method that encodes implicit human values/knowledge in the feature set by extracting these features based on common-sense model built on common sense knowledge graphs/data. Additionally, the ability of counter factual data to encode key distinguishing features between classes. The proposed methods may also be employed with a Siamese network to allow better understanding of such counter factual data and the distinguishing moral values. The network takes common sense augmented features as its input and tries to distinguish between counter factual samples based on it. As a result, system and method capable of distinguishing between situations based on common sense reasoning with lesser data, are achieved.

Figure 3A:
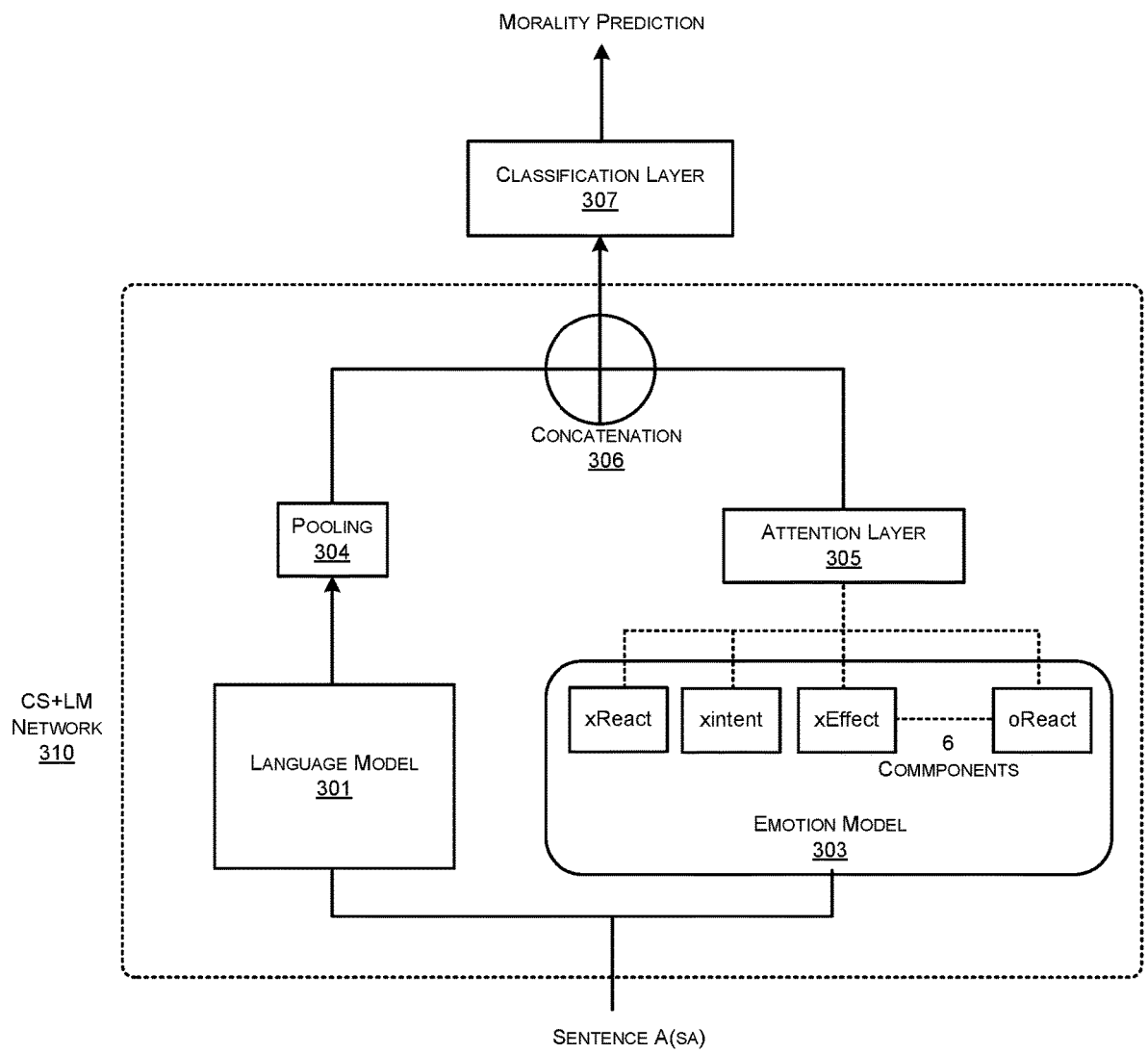
FIGS. 3A and 3B illustrate an exemplary block diagram for training the language model and common-sense model with one input sentence and multiple sentences forming counterfactual data, respectively, in accordance with embodiments of the present disclosure.
Figure 3B:
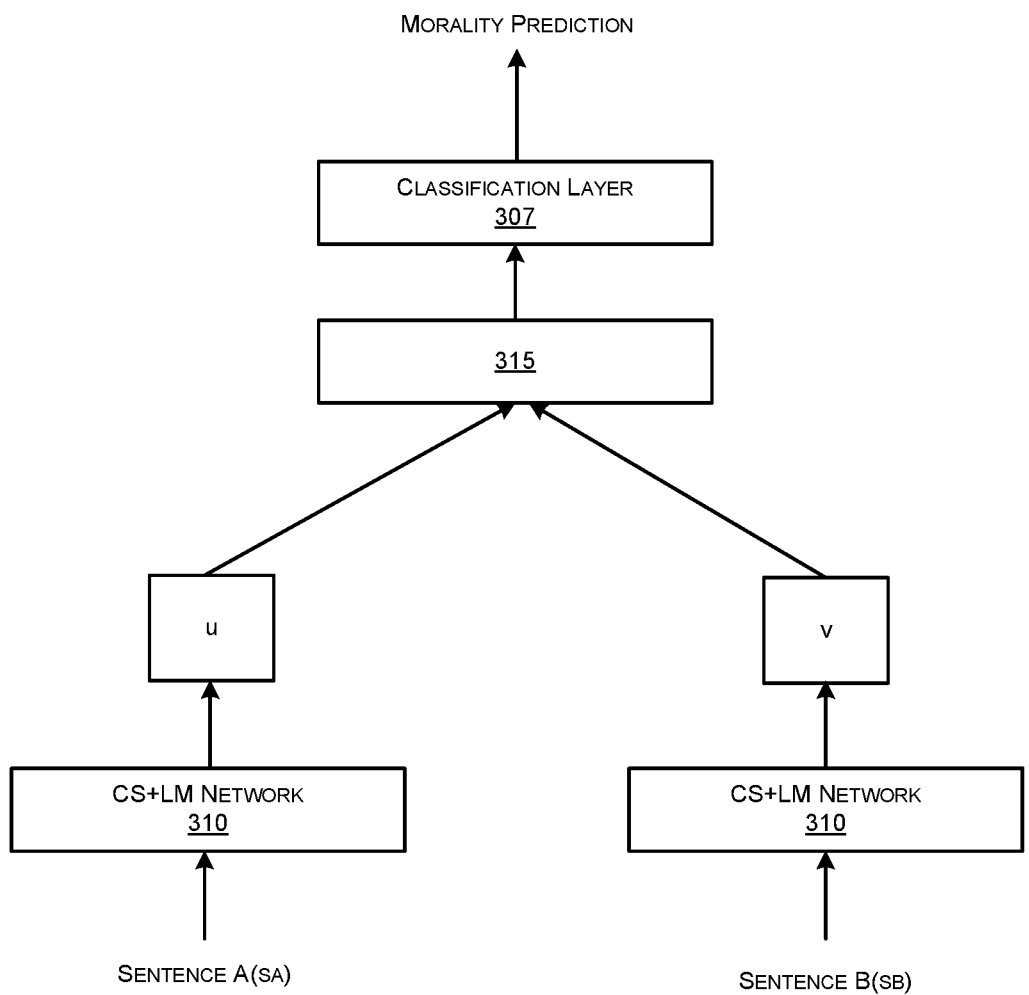

FIGS. 3A and 3B illustrate an exemplary block diagram for training the language model and common-sense model with one input sentence and multiple sentences forming counterfactual data, respectively, in accordance with embodiments of the present disclosure.

As illustrated, the system 102 may receive input data such as a sentence, which can be considered as input to the language model 301 and common-sense model 303. The language model may generate a first vector representing n-dimensional data. The language model may be selected from a predefined set of language models. The common-sense model may also generate second vectors corresponding to common-sense characteristics. Each second vector represents n-dimensional data corresponding to an common-sense characteristic such as reaction, intent, effect and so on. In an example, the number of second vectors may be equal to number of common-sense parameters/characteristics. The second vectors may go through an attention layer 305 of the system 102. The attention layer 305 may be implemented as a set of instructions being executed by one or more processors of the system 102. At pooling stage 304, the first vector may be pooled and then sent for concatenation block 306. At the concatenation block 306, the first vector and all the second vectors may be combined together to form a third vector.

The blocks 301, 303, 304, 305, and 306 may be combinedly known as CS+LM network 310. The classification layer 307 of system 102 may convert the third vector into morality values. In an exemplary embodiment, the system 102 may determine how much fraction/percentage the sentence is morally correct. The attention layer 305 or classification layer 307 may be implemented as a set of instructions being executed by one or more processors of the system 102.

FIG. 3B illustrates block diagram for training the language model and common-sense model with counterfactual data. In counterfactual data, there is slight variation between sentences in terms of words but a large difference between the meaning or morality.

Sentence 1: "I deserve for the judge to give me community service instead of jail because I'm white."

Sentence 2: I deserve for the judge to give me community service instead of jail because I only stole a candy bar.

As shown above, there is sight changes in words between sentence 1 and sentence 2. However, sentence 1 is morally incorrect whereas sentence 2 is morally correct. The training of models with such counter factual data increases accuracy of the overall system.

Each sentence of the counterfactual data may be sent to CS+LM network 310, and second vectors u and v are generated for a pair of the counterfactual data/sentences. At block 315, a vector difference between vector (u−v) is calculated. Based on the vectors, u, v, |u−v|, at classification layer 307, morality value is determined similar to FIG. 3A.

Figure 4A:
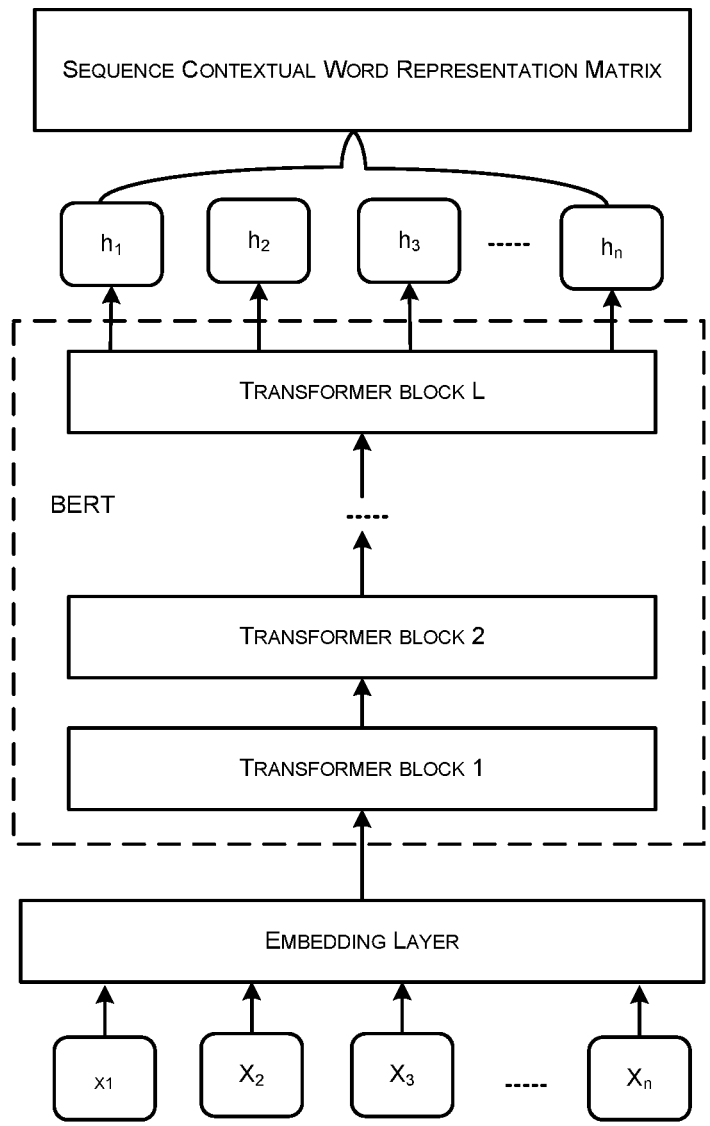
FIG. 4A illustrates an exemplary representation of the block diagram of the language model, in accordance with an embodiment of the present disclosure.

FIG. 4A illustrates an exemplary representation of the block diagram of the language model, in accordance with an embodiment of the present disclosure. As illustrated in FIG. 4, in the language model such as BERT, the input sentence in tokenized form (X1, X2, . . . Xn). The block diagram shows how an input sentence is converted to a corresponding vector representation by embedding. In the draft, the "pooling" operation is performed on (h1, h2 . . . hn) which is generally a mean value computation.

Figure 4B:
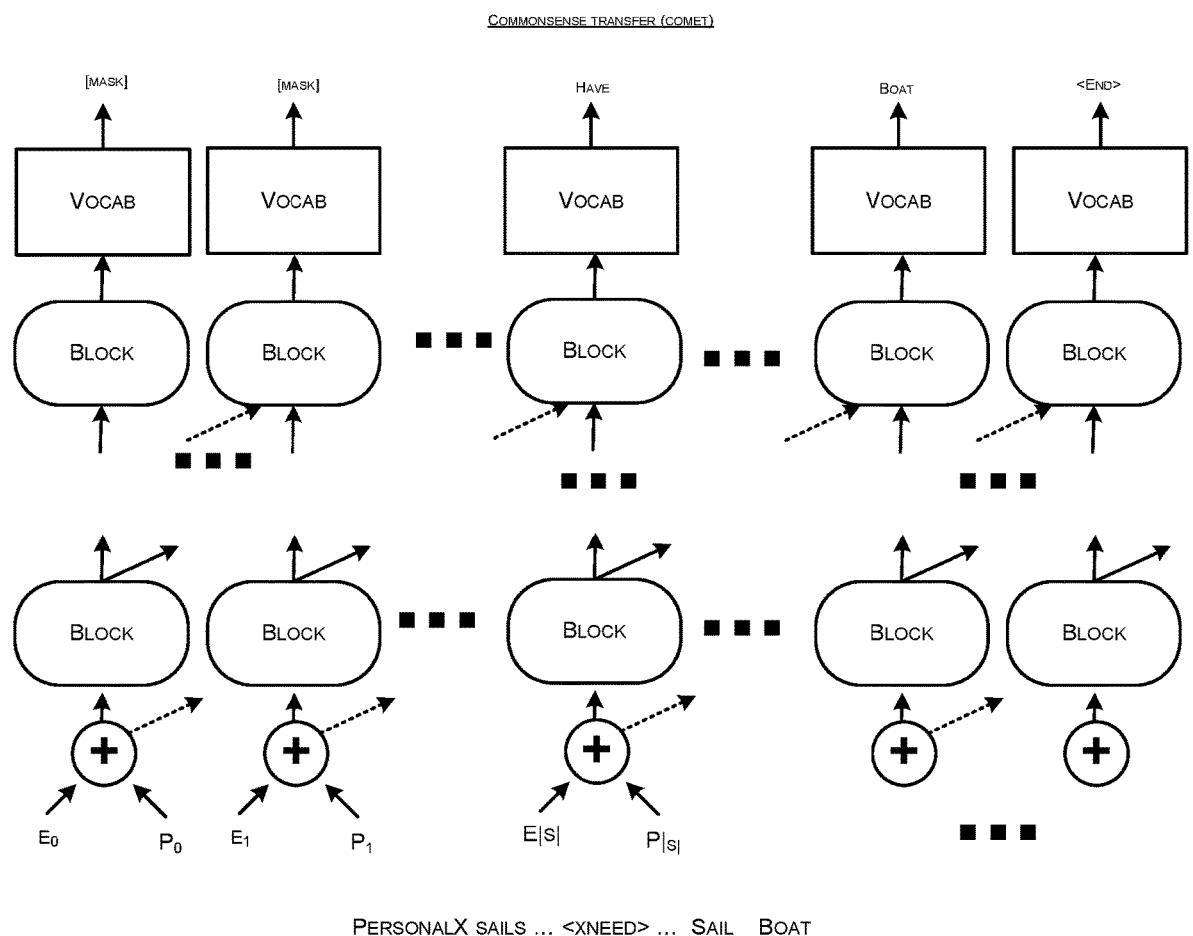
FIG. 4B illustrates an exemplary representation of the block diagram of the common-sense model, in accordance with an embodiment of the present disclosure.

FIG. 4B illustrates an exemplary representation of the block diagram of the common-sense model, in accordance with an embodiment of the present disclosure. FIG. 4C illustrates an exemplary representation of input data fed to the common-sense model, in accordance with an embodiment of the present disclosure.

As illustrated in FIGS. 4B and 4C, the common-sense model such as COMET is trained through learns to predict phrase object "o" from the concatenated phrase subject "s" and relation "r". This training data in the {s, r, o} form is derived from ATOMIC Net (the common-sense knowledge graph used in COMET). When training is completed, a phrase subject such as "PersonX goes to the mall" is fed to the model along with the required relation such as "xIntent" to get out phrase object prediction such as "to buy clothes".

It should be noted that the above model has been used for illustration purposes. It would be appreciated by a person of ordinary skill in the art to replace the above language model with any suitable model.

Figure 5:
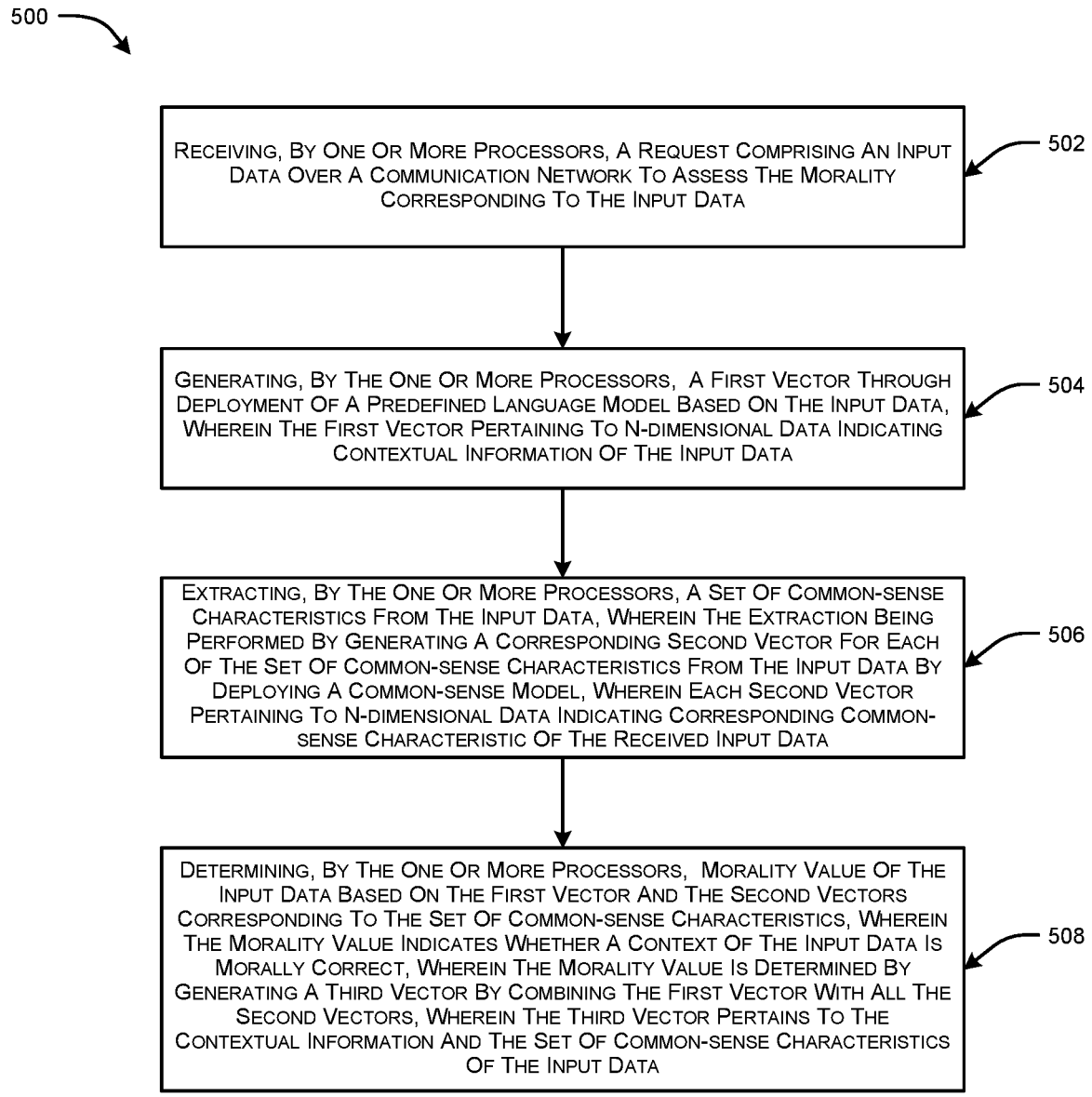
FIG. 5 illustrates a flow diagram representing a method for assessing morality of a user, in accordance with embodiments of the present disclosure.

FIG. 5 illustrates a flow diagram representing a method 500 for assessing morality of a user, in accordance with embodiments of the present disclosure. As illustrated in FIG. 5, at step 502, a request comprising an input data may be received over a communication network to assess the morality corresponding to the input data. At step 504, a first vector may be generated through deployment of a predefined language model based on the input data. The first vector may pertain to n-dimensional data indicating contextual information of the input data.

In an embodiment, at step 506, a set of common-sense characteristics may be extracted from the input data. The extraction may be performed by generating a corresponding second vector for each of the set of common-sense characteristics from the morality data by deploying a common-sense model. Each second vector pertaining to n-dimensional data indicating corresponding common-sense characteristic of the received morality data. At step 508, a morality value may be determined for the morality data based on the first vector and the second vectors corresponding to the set of common-sense characteristics, the morality value indicates whether a context of the input data is morally correct, wherein the morality value is determined by generating a third vector by combining the first vector with all the second vectors. The third vector pertains to the contextual information and the set of common-sense characteristics of the input data.

Figure 6:
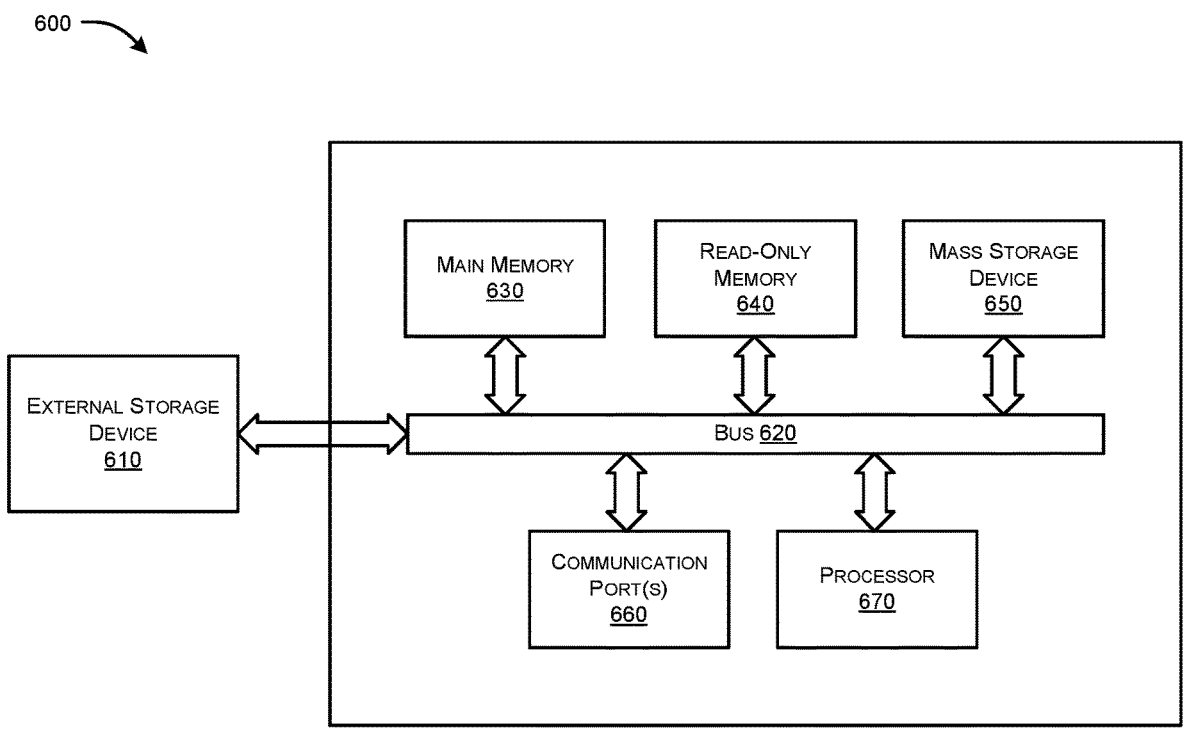
FIG. 6 illustrates an exemplary computer system to implement the proposed system in accordance with embodiments of the present disclosure.

FIG. 6 illustrates an exemplary computer system 600 to implement the proposed system in accordance with embodiments of the present disclosure.

As shown in FIG. 6, computer system can include an external storage device 610, a bus 620, a main memory 630, a read only memory 640, a mass storage device 650, communication port 660, and a processor 670. A person skilled in the art will appreciate that computer system may include more than one processor and communication ports. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention. Communication port 660 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g., start-up or BIOS instructions for processor 670. Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer systems. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, to avoid obscuring the present invention.

While the foregoing describes various embodiments of the disclosure, other and further embodiments of the disclosure may be devised without departing from the basic scope thereof. The disclosure is not limited to the described embodiments, versions or examples, which are included to enable a person having ordinary skill in the art to make and use the disclosure when combined with information and knowledge available to the person having ordinary skill in the art.

Advantages of the Invention

The present disclosure provides system and method that extract one or more common-sense characteristics of the user.

The present disclosure provides system and method that uses counter factual data for training purposes so as to improve the accuracy with a lesser amount of data.

The present disclosure provides system and method that are capable of assessing the morality of the user with higher accuracy compared to conventional systems.

The present disclosure provides a system that is economic and easy to implement.

I claim:

1. A system for assessing morality of a user, the system comprising:
    a processor; and
    a memory storing instructions, which when executed by the processor, cause the system to:
        receive a request comprising an input data over a communication network to assess the morality corresponding to the input data;
        generate a first vector through deployment of a predefined language model based on the input data, wherein the first vector pertaining to n-dimensional data indicating contextual information of the input data;
        extract a set of common-sense characteristics from the input data, wherein the extraction being performed by generating a corresponding second vector for each of the set of common-sense characteristics from the input data by deploying a common-sense model, wherein each second vector pertaining to n-dimensional data indicating corresponding common-sense characteristic of the received input data; and
        determine morality value of the input data based on the first vector and the second vectors corresponding to the set of common-sense characteristics, wherein the morality value indicates whether a context of the input data is morally correct, wherein the morality value is determined by generating a third vector by combining the first vector with all the second vectors, wherein the third vector pertains to the contextual information and the set of common-sense characteristics of the input data.

2. The system as claimed in claim 1, wherein the system is configured to:
    assign a weightage to each of the set of common-sense characteristics based on the received morality training data, wherein the weightage indicates relevancy of a corresponding common-sense characteristic in determining the morality value; and
    modify each of the second vectors according to the corresponding weightage,
    wherein the third vector is generated by combining the first vector with the all the modified second vectors.

3. The system as claimed in claim 1, wherein the contextual information of the input data is determined based on a first set of parameters associated with the predefined language model, wherein the set of common-sense characteristics are extracted based on a second set of parameters associated with common-sense model is associated, wherein the predefined language model and common-sense model is trained by:
    receiving a first data segment and a second data segment, forming counterfactual data, and morality value corresponding to the first data segment and the second segment; and
    updating the first and the second sets of parameters based on the first and the second data segments and corresponding morality values.

4. The system as claimed in claim 1, wherein the input data includes any or a combination of visual data, voice data, and textual data.

5. The system as claimed in claim 1, wherein the one or more common-sense characteristics capture attributes of the user corresponding to different dialogues, activities, and social interactions extracted from the input data.

6. The system as claimed in claim 1, wherein the system is configured to provide a machine-learning based reasoning to provide an explanation for the determination of the morality value.

7. A method for assessing morality of a user, the method comprising:
    receiving, by one or more processors, a request comprising an input data over a communication network to assess the morality corresponding to the input data;
    generating, by the one or more processors, a first vector through deployment of a predefined language model based on the input data, wherein the first vector pertaining to n-dimensional data indicating contextual information of the input data;
    extracting, by the one or more processors, a set of common-sense characteristics from the input data, wherein the extraction being performed by generating a corresponding second vector for each of the set of common-sense characteristics from the input data by deploying a common-sense model, wherein each second vector pertaining to n-dimensional data indicating corresponding common-sense characteristic of the received input data; and
    determining, by the one or more processors, morality value of the input data based on the first vector and the second vectors corresponding to the set of common-sense characteristics, wherein the morality value indicates whether a context of the input data is morally correct, wherein the morality value is determined by generating a third vector by combining the first vector with all the second vectors, wherein the third vector pertains to the contextual information and the set of common-sense characteristics of the input data.

8. The method as claimed in claim 7, further comprising:
    assigning, by the one or more processors, a weightage to each of the set of common-sense characteristics based on the received morality training data, wherein the weightage indicates relevancy of a corresponding common-sense characteristic in determining the morality value; and modifying, by the one or more processors, each of second vectors according to the corresponding weightage;

wherein the third vector is generated by combining the first vector with all the modified second vectors.

* * * * *